United States Patent [19]

Togawa et al.

[11] Patent Number: 5,756,017
[45] Date of Patent: May 26, 1998

[54] METHOD OF SIMULATING RESIN BEHAVIOR IN PRESS MOLDING

[75] Inventors: Yoshiaki Togawa; Masaaki Tsutsubuchi, both of Ichihara; Masahito Matsumoto; Yukito Nakamura, both of Ibaraki; Takeo Kitayama, Takatsuki, all of Japan

[73] Assignee: Sumitomo Chemical Company, Limited, Osaka, Japan

[21] Appl. No.: 708,196

[22] Filed: Sep. 6, 1996

[30] Foreign Application Priority Data

Sep. 8, 1995  [JP]  Japan ................................ 7-256722

[51] Int. Cl.$^6$ ........................ B29C 45/82; B29C 43/58
[52] U.S. Cl. .................. 264/40.1; 264/319; 264/328.7; 364/475.02; 364/475.05
[58] Field of Search ........................ 264/40.1, 40.4, 264/40.5, 40.7, 319, 320, 325, 328.1, 328.7, 328.12; 73/708; 364/475.02, 476.01, 475.08; 425/150, 149

[56] References Cited

U.S. PATENT DOCUMENTS

| | | | |
|---|---|---|---|
| 3,890,413 | 6/1975 | Peterson | 264/40.5 |
| 4,816,197 | 3/1989 | Nunn | |
| 4,989,166 | 1/1991 | Akasaka et al. | 364/475.02 |
| 5,031,127 | 7/1991 | Fujita et al. | 364/475.02 |
| 5,062,053 | 10/1991 | Shirai et al. | 364/475.05 |
| 5,529,478 | 6/1996 | Siegrist et al. | 425/150 |

OTHER PUBLICATIONS

Patent Abstracts of Japan, vol. 014, No. 256 (M–0980), 4 Jun. 1990.
Patent Abstracts of Japan, vol. 012, No. 192 (P–712), 4 Jun. 1988.
Patent Abstracts of Japan, vol. 018, No. 317 (M–1622), 16 Jun. 1994.
Patent Abstracts of Japan, vol. 96, No. 001.
Wei et al., *A Nonlinear Dynamic Model of a Servo–Pump Controlled Injection Molding Machine*, Polymer Engineering & Science, vol. 34, No. 11, pp. 881–997 (15 Jun. 1994).
Bird et al, 'Dynamics of Polymeric Liquids', Review of Newtonian Fluid Dynamics, vol. 1, pp. 19–21.
Tucker, Charles, 'Injection and Compression Molding Fundamentals', The University of Akron, pp. 481–565 (1987).

*Primary Examiner*—Jill L. Heitbrink
*Attorney, Agent, or Firm*—Chushman Darby & Cushman IP Group of Pillsbury Madison & Sutro, LLP

[57] ABSTRACT

In a method of simulating flow behavior of a resin in a process for press-molding the resin by use of a press-molding machine comprising a press apparatus equipped with a hydraulic circuit, and first and second molds at least one of which is connected to the press apparatus, disclosed is a method comprising a step of determining, from a characteristic of the hydraulic circuit, an elastic coefficient of the press apparatus, and an apparent elastic coefficient of the resin, a true compression rate imparted to the resin by the press apparatus, and a step of sequentially analyzing, based on the true compression rate, flow behavior of the resin.

9 Claims, 9 Drawing Sheets

METHOD OF SIMULATING RESIN BEHAVIOR IN PRESS MOLDING

BACKGROUND OF THE INVENTION

1. Field of the Invention

The present invention relates to a method of simulating resin behavior in press molding (e.g., transfer molding or injection press molding, the latter of which refers to composite molding of injection molding and press molding (or compression molding)) and, in particular, to a method of simulating flow behavior, which analyzes a shaping process exemplified by extension of a flowable resin such as polypropylene resin within molds during press molding (injection press molding in particular) of the resin.

2. Related Background Art

In press molding, for product quality of molded resin articles, it is of an important factor to design a mold configuration in which flow behavior of resin or the like is optimized. A mold configuration for press molding has been conventionally determined as trial and error are repeated on the basis of the rule of thumb of an expert.

Together with recent advance in computer technology, on the other hand, it has become possible to analyze flow behavior of a flowable resin by computer simulation when such a resin is molded by press molding. In order to study the mold design or molding condition for resin molding, it has been made practicable to perform flow analysis of a resin and then investigate how to optimize the mold design or molding condition. Here, a numerical analysis method such as finite element method, boundary element method, or difference calculus is applied to a model of resin flow path form within the molds, thereby determining the flow pattern of the flowable resin, pressure distribution, temperature distribution, shearing stress distribution, or the like within the molds as a function of time.

Such a simulation method of resin behavior in press molding is disclosed, for example, in A. I. Isayev, ed., *Injection and Compression Molding Fundamentals*, (Marcel Dekker Inc., 1987), pp.481–565.

SUMMARY OF THE INVENTION

The inventors have found the following problem in the above-mentioned conventional methods. In the conventional methods of simulating resin behavior in press molding, the flow behavior of resin is analyzed assuming that the compression rate or compressive force imparted to the resin is constant or conforms to a pattern set beforehand. At the time of actual press molding, however, compression of hydraulic oil, deflection in the press apparatus, or the like occurs. Accordingly, the resin is subjected to a compression rate which does not coincide with the compression rate theoretically calculated from its hydraulic circuit characteristic, thereby yielding an error in analysis of flow behavior of the resin.

In view of the foregoing circumstances, it is an object of the present invention to provide a simulation method in press molding (injection press molding in particular) which can perform flow analysis of resins more accurately.

The simulation method of the present invention is a method of simulating flow behavior of a resin in a process for press-molding the resin by use of a press-molding machine comprising a press apparatus equipped with a hydraulic circuit, and first and second molds at least one of which is connected to the press apparatus, wherein the method comprises a step of determining, from a characteristic of the hydraulic circuit, an elastic coefficient of the press apparatus, and an apparent elastic coefficient of the resin, a true compression rate imparted to the resin by the press apparatus. It may further comprise a step of analyzing, based on the true compression rate, flow behavior of the resin.

In the method of the present invention, wherein the true compression rate imparted to the resin by the press apparatus may be determined from a theoretical compression rate determined from a characteristic of the hydraulic circuit assuming that at least the press apparatus is a rigid body, an elastic coefficient of the press apparatus and an apparent elastic coefficient of the resin, according to the following expression (1):

$$dF = \frac{K_0 K_1}{K_0 + K_1} dX = K_1 dX_1 \qquad (1)$$

wherein dF is amount of change in compressive force, $K_0$ is elastic coefficient of the press apparatus, $K_1$ is apparent elastic coefficient of the resin, dX is theoretical amount of change in compression distance and $dX_1$ is true amount of change in compression distance, and the following expression (2):

$$U_1 = \frac{K_0}{K_0 + K_1} U \qquad (2)$$

wherein $K_0$ is elastic coefficient of the press apparatus, $K_1$ is apparent elastic coefficient of the resin, U is theoretical compression rate and $U_1$ is true compression rate.

Preferably, in the simulation method of the present invention, the step of determining the true compression rate comprises:

a step (a) of determining an elastic coefficient of the press apparatus;

a step (b) of determining, from the characteristic of the hydraulic circuit, a theoretical compression rate in a first unit period and assuming this theoretical compression rate to be a true compression rate in the first unit period;

a step (c) of determining an amount of change in compressive force and a true amount of change in compression distance in the first unit period assuming that the true compression rate is constant, a step (d) of determining, from the characteristic of the hydraulic circuit, a theoretical compression rate in a second unit period subsequent to the first unit period;

a step (e) of determining, from the amount of change in compressive force and the true amount of change in compression distance, an apparent elastic coefficient of the resin and assuming this apparent elastic coefficient of the resin to be an apparent elastic coefficient of the resin in the second unit period; and a step (f) of determining, from the elastic coefficient of the press apparatus, the apparent elastic coefficient of the resin in the second unit period, and the theoretical compression rate in the second unit period, a true compression rate in the second unit period. In this case, the simulation method of the present invention may further comprise a step (g) of analyzing, based on the true compression rate, flow behavior of the resin in the above-mentioned unit periods.

Preferably, the simulation method of the present invention further comprises a step (h) of judging whether the true compression rate determined in the step (f) is more than zero or not. When the true compression rate is judged to be more than zero at the step (h), the above-mentioned steps (c) to (f) (or steps (c) to (g) in the case where the step (g) is included therein) are preferably repeated so as to successively determine true compression rates in unit periods subsequent to the second unit period. Further, in the case where the step (g) is included therein, the flow behavior can be successively analyzed on the basis of thus determined true compression rates.

In the step (e), the apparent elastic coefficient of the resin in the first unit period may be determined from the amount of change in compressive force and true amount of change in compression distance, and then an apparent elastic coefficient of the resin in the second unit period may be assumed on the basis of the apparent elastic coefficient of the resin in the first unit period and an apparent elastic coefficient of the resin in a previous unit period.

Preferably, in the simulation method of the present invention, the apparent elastic coefficient of the resin is determined in the above-mentioned step (e) according to the following expression (1):

$$dF = \frac{K_0 K_1}{K_0 + K_1} dX = K_1 dX_1 \quad (1)$$

wherein dF is amount of change in compressive force, $K_0$ is elastic coefficient of the press apparatus, $K_1$ is apparent elastic coefficient of the resin, dX is theoretical amount of change in compression distance, and $dX_1$ is true amount of change in compression distance; and the true compression rate is determined in the above-mentioned step (f) according to the following expression (2):

$$U_1 = \frac{K_0}{K_0 + K_1} U \quad (2)$$

wherein $K_0$ is elastic coefficient of the press apparatus, $K_1$ is apparent elastic coefficient of the resin, U is theoretical compression rate, and $U_1$ is true compression rate.

Further, when the molds have flat cavity faces in parallel to each other, in the above-mentioned step (c), the amount of change in compressive force can be determined according to the following expression (3):

$$F = \frac{3\pi R^4 \mu(-\dot{h})}{8h^3} \quad (3)$$

wherein F is compressive force, R is radius of the resin, μ is viscosity of the resin, h is ½ of distance between the molds, and $-\dot{h}$ is ½ of compression rate; and the true amount of change in compression distance can be determined according to the following expression (4):

$$dX_1 = U_1 \times dt \quad (4)$$

wherein $dX_1$ is true amount of change in compression distance, $U_1$ is true compression rate, and dt is unit period.

In accordance with the simulation method of the present invention, based on a spring model which will be explained later, the true compression rate in a press-molding process can be determined with a considerable accuracy as being computed from the hydraulic circuit characteristic, the elastic coefficient of the press apparatus, and the apparent elastic coefficient of the resin. As the flow behavior of the resin is sequentially analyzed on the basis of the accurate compression rate (true compression rate) imparted to the resin, results of simulation concerning the flow behavior of the resin can be obtained with a higher accuracy.

Here, the press molding in accordance with the present invention encompasses not only the press molding in the narrow sense such as transfer molding but also so-called injection press molding. The injection press molding refers to a method in which a molten resin (flowable resin) is supplied to between molds in an unclosed state and then the molds are closed so as to press and shape (mold) the resin, i.e., a method combining the injection molding and the press molding or compression molding in the narrow sense together, as will be explained later in detail.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, the present invention will be explained in detail with reference to drawings. Here, in the drawings, parts identical or equivalent to each other will be referred to with marks identical to each other.

First, the principle of the simulation method in accordance with the present invention will be explained.

Figure 1:
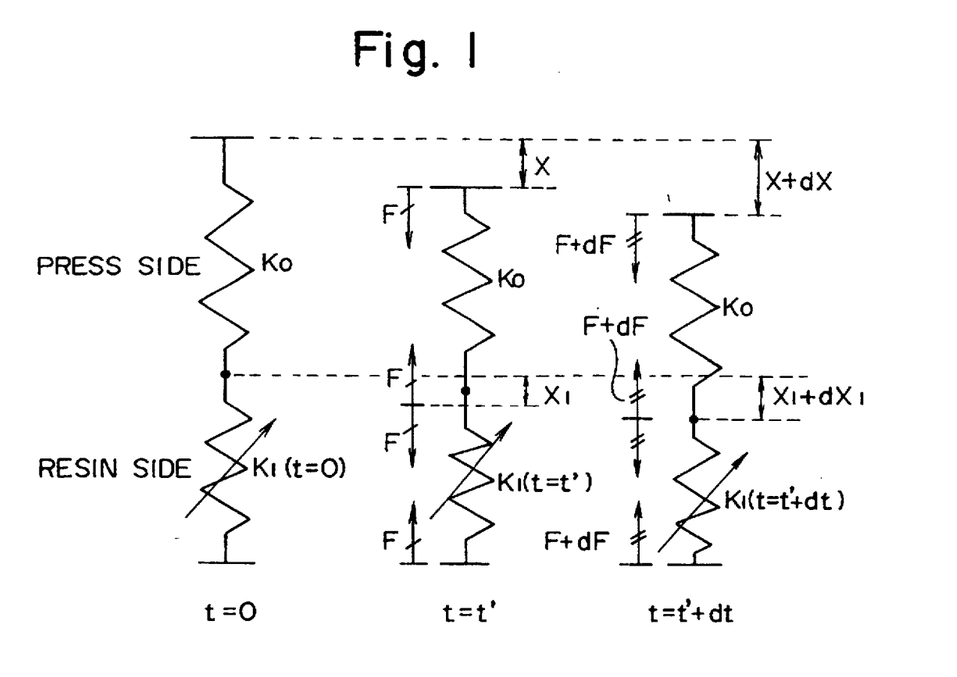
FIG. 1 is a schematic view for explaining the principle of the simulation method in accordance with the present invention.

FIG. 1 is a diagram showing the principle (spring model) by which a compression rate imparted to the resin is computed by calculation in the present invention.

A true compression rate is determined on the basis of a model in which a spring (spring constant $K_0$) corresponding to the elastic coefficient of the apparatus including the molds and press machine and a spring (spring constant $K_1$) corresponding to the apparent elastic coefficient of the resin which successively changes during a compression process are serially connected to each other so as to form an elastic circuit as shown in FIG. 1. The true compression rate is determined from the following relational expressions:

$$dF = \frac{K_0 K_1}{K_0 + K_1} dX = K_1 dX_1 \quad (1)$$

and from expression (1)

$$\frac{K_0 K_1}{K_0 + K_1} \frac{dX}{dt} = K_1 \frac{dX_1}{dt}$$

wherein $$\frac{dX}{dt} = U$$

$$\frac{dX_1}{dt} = U_1$$

accordingly $$U_1 = \frac{K_0}{K_0 + K_1} U \quad (2)$$

wherein dF is amount of change in compressive force, $K_0$ is elastic coefficient of the press apparatus, $K_1$ is apparent elastic coefficient of the resin, dX is theoretical amount of change in compression distance, $dX_1$ is true amount of change in compression distance, U is theoretical compression rate, and $U_1$ is true compression rate.

Figure 2:
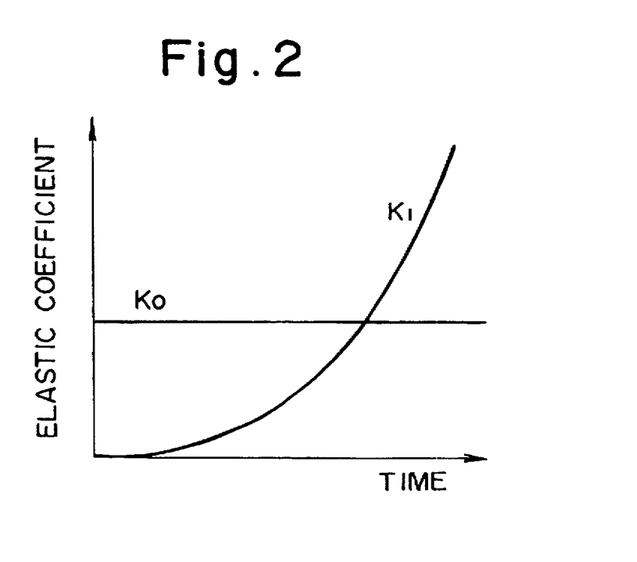
FIG. 2 is a graph showing an example of relationship between elastic coefficient (spring constant $K_0$) of a press apparatus and apparent elastic coefficient (spring constant $K_1$) of a resin.

As shown in FIG. 2, the elastic coefficient of the apparatus (spring constant: $K_0$) is substantially constant regardless of time, whereas the apparent elastic coefficient of the resin (spring constant: $K_1$) exponentially increases over time.

Based on the elastic circuit (spring model) in which the spring on the press machine side and the spring on the resin side are serially connected to each other as shown in FIG. 1, the spring constant of the spring on the resin side (apparent elastic coefficient of the resin: $K_1$) can be determined from the relationship (expression (1)) between the minute change $dX_1$ in compression distance of the resin and the minute change dF in compressive force. Then, when the elastic coefficients $K_0$ and $K_1$ are substituted into the relationship (expression (2)) between the compression rate (U), which is theoretically determined from a hydraulic circuit characteristic assuming that the press apparatus is a rigid body, and the true compression rate ($U_1$) imparted to the resin, the true compression rate ($U_1$) can be determined. Then, with thus determined $U_1$, simulation of flow behavior of the resin during a minute time Δt is effected. As in the case of the prior art, a numerical analysis method such finite element method or boundary element method is utilized. The computation of the true compression rate ($U_1$) imparted to the resin indicated here and the simulation of flow behavior upon compression of the resin can be repeated for each period of time Δt. Accordingly, change in the compression rate imparted to the resin over time can be obtained more accurately than that in the conventional simulation method. Therefore, the results of analysis of flow behavior such as flow pattern, pressure distribution, and temperature distribution of the resin can be obtained with an accuracy much higher than that of the conventional simulation method.

As a method of simulating flow behavior of a resin from the true compression rate, a method disclosed, for example, in A. I. Isayev, ed., *Injection and Compression Molding Fundamentals*, (Marcel Dekker Inc., 1987), pp.481–565 can be used. This publication is incorporated herein as reference.

In the following, a preferable embodiment of the present invention will be explained with reference to FIGS. 1 to 6.

Figure 3:
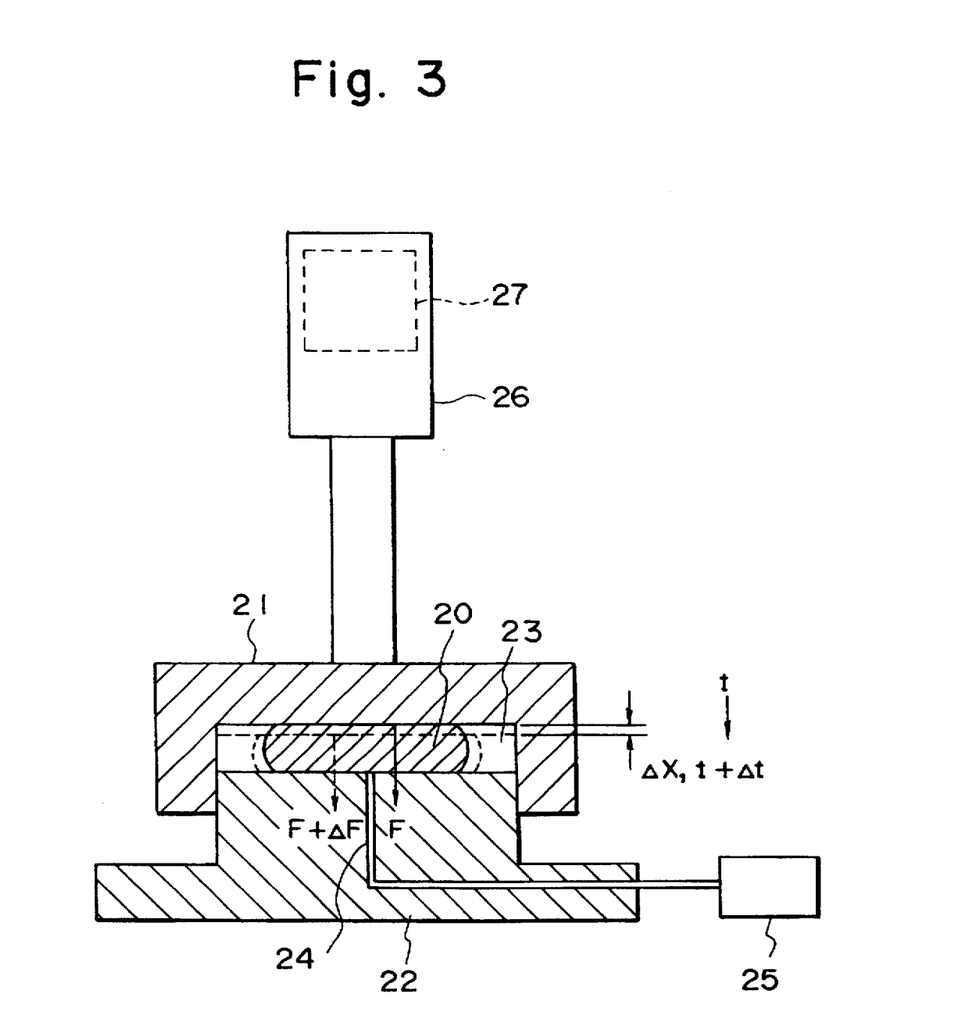
FIG. 3 is a schematic cross-sectional view showing an injection press molding machine which is subjected to an embodiment of the simulation method in accordance with the present invention.

FIG. 3 shows a model of a press molding machine which is subjected to an embodiment concerning the simulation method of the present invention. Though a process simulation for injection press molding is explained here, the press molding in the narrow sense can be treated in totally the same manner when the injection part of the injection press-molding process is omitted.

In the following simulation, molds of a parallel plate type shown in FIG. 3 are used. Accordingly, analysis of flow behavior upon compression of the resin is simplified with the following Stefan's expression:

$$F = \frac{3\pi R^4 \mu(-h)}{8h^3}$$

wherein F is compressive force (force required for compression), R is radius of the (disk-shaped) resin, μ is viscosity of the resin, h is ½ of distance between the molds (press plates), and −h is ½ of compression rate.

Stefan's expression is disclosed, for example, in R. B. Bird et al., *Dynamics of Polymeric Liquids Vol. 1*, (John Wiley & Sons, 1977), pp. 19–21, which is incorporated herein as reference.

In FIG. 3, a male mold 22 is a fixed mold, whereas a female mold 21 is a movable mold. Initially, the female mold 21 is placed above its depicted position, and a molten resin 20 at a high temperature is injected into a cavity 23 in an unclosed state from a molten-resin injection path 24 connected to a molten resin injection unit 25. After completion of the injection, a gate of the molten-resin injection path 24 is closed, whereby the process shifts to a compression step. The compression is effected as the female mold 21 is pushed down by a press apparatus 26 connected thereto. The press apparatus 26 is driven by a hydraulic oil supplied from a hydraulic circuit 27. According to hydraulic circuit characteristics (circuit configuration and set values in the circuit), the amount of the hydraulic oil supplied from the hydraulic circuit 27 changes upon time or compressive force. Then, the molds 21 and 22 are closed so as to press and shape (mold) the resin 20.

Figure 4:
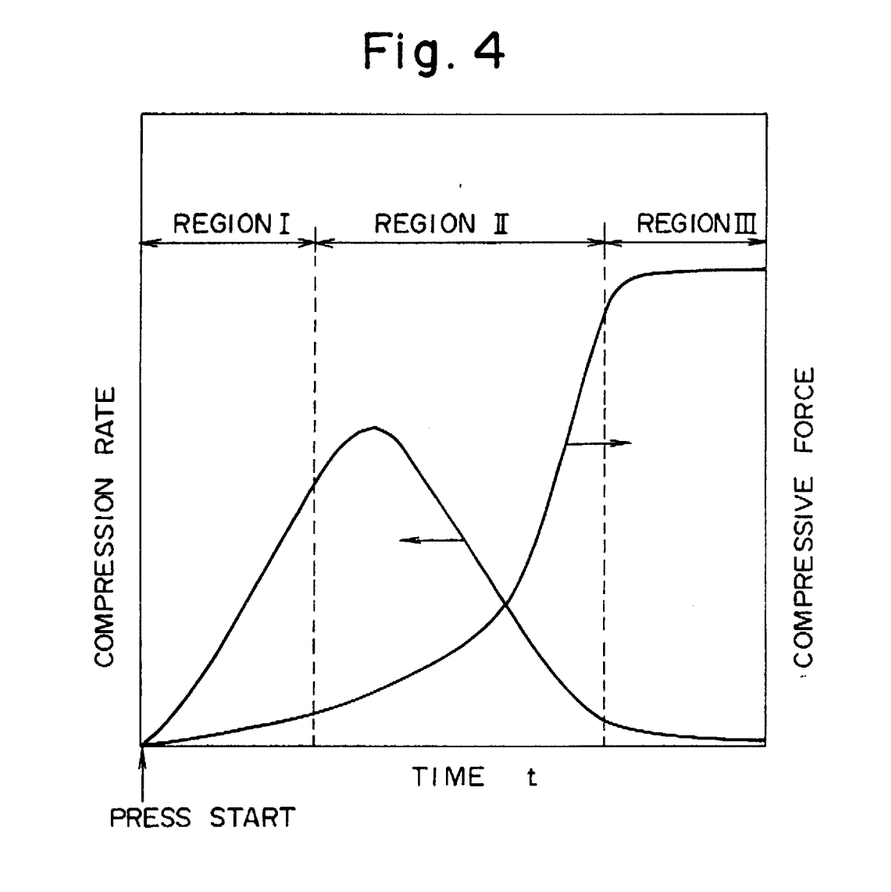
FIG. 4 is a graph showing an example of changes in compression rate and compressive force with respect to time in a press-molding process.

FIG. 4 shows a summary of actual changes in compression rate and compressive force over time in a press-molding process.

The female mold 21 initially moves downward with a rate corresponding to the hydraulic circuit characteristics. This state corresponds to region I (initial acceleration region in this example) in the following Table and a state in FIG. 2 where the apparent elastic coefficient (spring constant) $K_1$ of the resin is sufficiently smaller than the elastic coefficient (spring constant) $K_0$ of the apparatus.

TABLE

Change in State of Characteristics in Press Apparatus

| Region | Explanation | State of apparatus model |
|---|---|---|
| I | initial acceleration region (rate restricting region) | $K_1 \ll K_0$ |
| II | acceleration reducing region to rate reducing region | $K_1 \sim K_0$, $K_1 > K_0$ |
| III | pressure restricting region | calculated clamping force $\sim$ set clamping force |

(Note) The symbol "$\sim$" means "has the order of magnitude of".

Nevertheless, the flowable resin 20 exists within the cavity 23 between the male and female molds 22 and 21. Accordingly, the resin 20 receives a compressive force F from the male and female molds 22 and 21, whereas the male and female molds 22 and 21 receive a reaction force F accompanying the compression of the resin 20. As the cavity 23 is narrower, i.e., the flowable resin 20 is further molded, the total flow resistance of the resin increases, whereby the force F becomes greater. This state corresponds to region II in FIG. 4 (acceleration reducing region to rate reducing region in this example) where the apparent elastic coefficient (spring constant) $K_1$ of the resin nearly equals to or greater than the elastic coefficient (spring constant) $K_0$ of the apparatus.

Namely, assuming that the true compression rate imparted to the resin 20 during a period in which time passes from t to $t+\Delta t$ is $U_1$, the minute change in the compression distance of the resin is $\Delta X_1$ ($=U_1 \times \Delta t$). During this period, as the total flow resistance increases, the compressive force F increases by $\Delta F$.

Here, by allowing the hydraulic oil to escape therefrom after the compressive force F reaches a predetermined upper limit, the hydraulic circuit operates so as to prevent the compressive force F from rising above the upper limit. This operation corresponds to region III in FIG. 4.

In the following, a preferable embodiment of the simulation method in accordance with the present invention will be explained in further detail with reference to a flow chart shown in FIG. 5. According to the flow chart shown in FIG. 5, the simulation method in accordance with the present invention is performed by use of a computer in the following manner.

Figure 5:
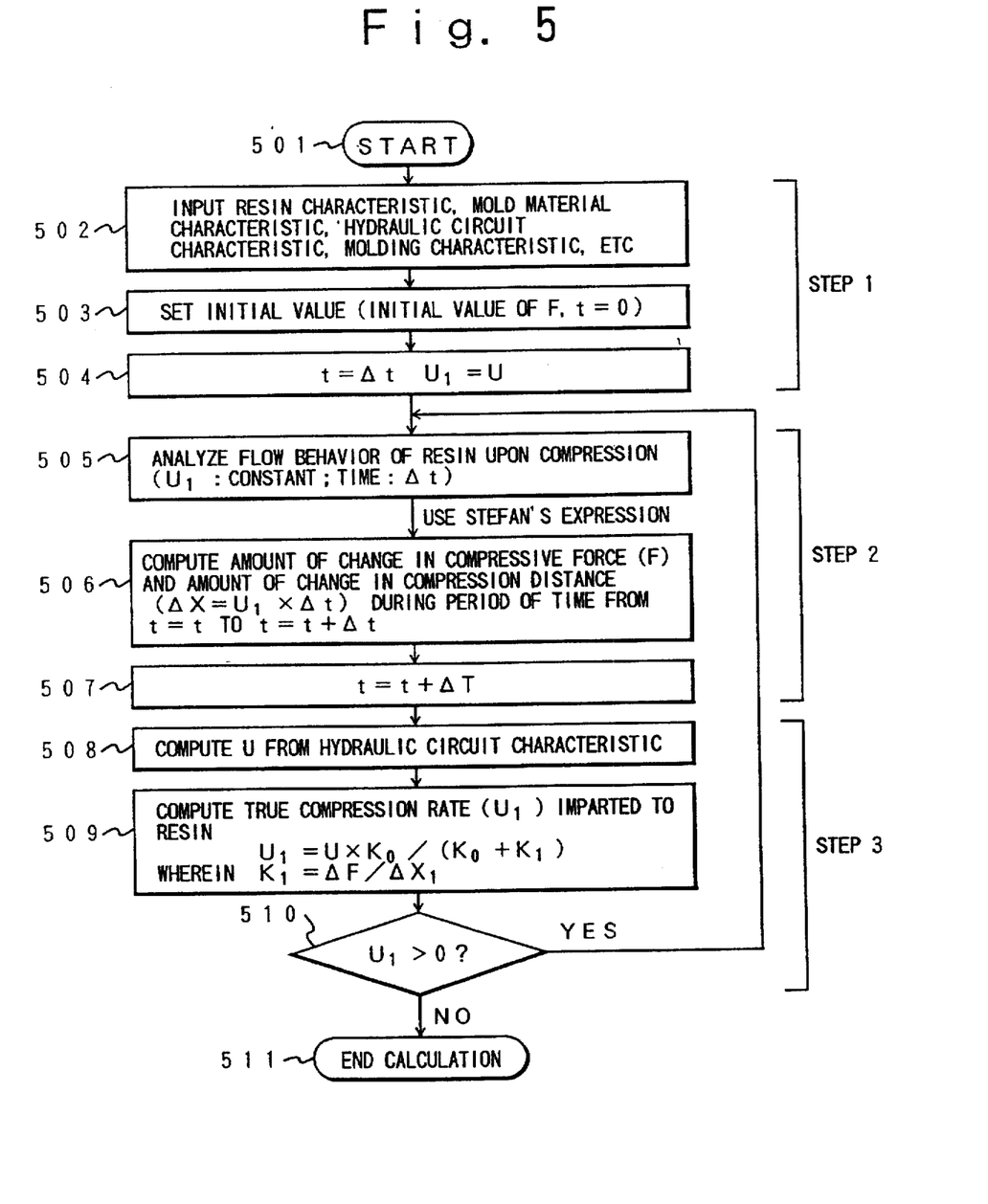
FIG. 5 is a flow chart showing various steps in an embodiment of the simulation method in accordance with the present invention.

As shown in FIG. 5, initially after starting (501), characteristics of a resin to be molded such as viscosity, specific heat, thermal conductivity, and density; data such as a characteristic (e.g., thermal conductivity) and form of molds; and a molding condition (e.g., resin temperature, mold temperature, amount of resin supplied, and position for starting compression) are input as initial conditions (502). Also, a hydraulic circuit characteristic, i.e., dependency of supply rate of mold-driving hydraulic oil upon time or compressive force, is input (502). Further, the elastic coefficient (spring constant) $K_0$ of the press apparatus is determined and input (502). Here, setting of the upper limit for the compressive force is included in the hydraulic circuit characteristic.

The elastic coefficient of the press apparatus can be theoretically determined on the basis of characteristics of units of the apparatus. Further, the elastic coefficient may be determined by actual measurement.

Then, an initial value of the compressive force (i.e., clamping force at the time of completion of injection) is set (503). Further, an initial value of time t is set as zero (503). Thereafter, assuming that $t=\Delta t$ (first unit period), compression rate $U_1$ of the resin at this time is set to compression rate U (U>0, here) which is theoretically determined from the hydraulic circuit characteristic (504). The foregoing steps (502) to (504) may be called step 1 hereinafter.

Here, the theoretical compression rate can be determined from the characteristics of the hydraulic circuit (i.e. the operation characteristic of the hydraulic pump, the operation characteristic of the valve(s) in the hydraulic circuit, the structure of the hydraulic circuit, and the like).

Then, assuming that the compression rate $U_1$ is constant, flow behavior such as extension, temperature, or compressive force of the resin is analyzed with respect to time $\Delta t$ (505), whereby amount of change in compressive force ($\Delta F$) and true amount of change in compression distance of the resin ($\Delta X_1 = U_1 \times \Delta t$) are determined (506). Thereafter, time is increased by $\Delta t$ (second unit period) (507). The foregoing steps (505) to (507) may be called step 2 hereinafter.

Here, the flow behavior of the resin and the amount of change in compressive force can be determined, for example, according to the disclosure in A. I. Isayev, ed., *Injection and Compression Molding Fundamentals*, (Marcel Dekker Inc., 1987), pp.481–565, or the above-mentioned Stefan's expression.

Subsequently, in a manner similar to that mentioned above, the theoretical compression rate U during $\Delta t$ (second unit period) is determined from the characteristic of the hydraulic circuit (508). Then, from the above-mentioned $\Delta F$ and $\Delta X_1$ (according to $K_1 = \Delta F/\Delta X_1$), apparent elastic coefficient (spring constant) $K_1$ of the resin is determined (509). Based on thus determined $K_1$ and the compression rate U imparted to the resin theoretically determined from the hydraulic circuit characteristic, the true compression rate $U_1 = U \times K_0/(K_0 + K_1)$ is determined (509). Also, it is judged whether the $U_1$ at this time is greater than zero or not (510). The foregoing steps (508) to (510) may be called step 3 hereinafter.

Then, when $U_1$ is zero, since the compression rate imparted to the resin is zero, namely, it indicates that flowing of the resin is terminated, calculation is ended. When $U_1$ is greater than zero, steps 2 and 3 are repeated.

In this manner, the true compression rates in the unit periods subsequent to the second unit period can be successively determined, and flow behavior of the resin can be sequentially analyzed on the basis of thus determined true compression rates.

Figure 6:
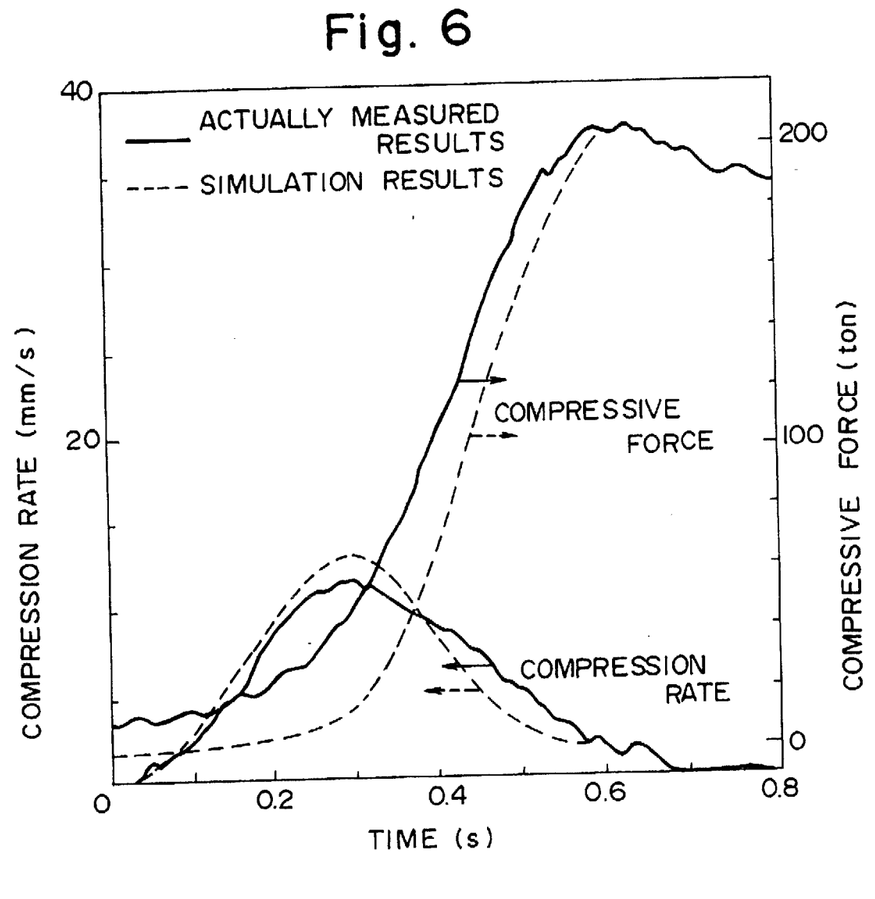
FIG. 6 is a graph showing a relationship between simulation results (compression rate and compressive force) and actually measured data in an embodiment of the present invention.

FIG. 6 compares the simulation results of the present invention with actually measured results. In this chart, continuous curves indicate results of actual measurement, whereas broken curves indicate results of simulation. Here, polypropylene (Sumitomo Noblen W501) is used as the resin. As shown in FIG. 6, in the embodiment of the present invention, the simulation results and the actually measured results are close to each other, thereby indicating that the compression rates and compressive force imparted to the resin are accurately simulated. As a result, analysis of flow behavior such as extension of the resin can approximate its actual state. Here, the actually measured result of compressive force was obtained from the result of measurement of hydraulic pressure by a pressure sensor, whereas the actually measured result of compressive force was determined from an output obtained when a signal of a position sensor attached to the molds was differentiated by time.

Though a preferable embodiment of the present invention is explained in the foregoing, it is needless to mention that the present invention should not be restricted thereto.

For example, in the step (509) mentioned above, the apparent elastic coefficient of the resin in the second unit period may be assumed (linear extrapolation) on the basis of the apparent elastic coefficient of the resin in the first unit period which is determined from the amount of change in compressive force and true amount of change in compression distance, and an apparent elastic coefficient of the resin in a previous unit period which had been determined before the first unit period.

For example, though the analysis of flow behavior of resin is performed by use of Stefan's expression on the basis of a parallel plate type mold configuration, it is needless to mention that the gist of the present invention is applicable to a more complicated mold configuration.

Here, such a more complicated mold configuration can be simulated, for example, according to the disclosure in A. I. Isayev, ed., *Injection and Compression Molding Fundamentals*, (Marcel Dekker Inc., 1987), pp.481–565 by the use of a method such as finite element method.

In the following, so-called injection press molding, which is an example subjected to the simulation method of the present invention, will be explained.

Currently, so-called injection press-molding method is widely used as a method of molding a resin taking respective advantages of injection molding and press molding (in the narrow sense). An example in which a pallet plate is formed by an injection press-molding method will be explained with reference to FIGS. 7A to 7D.

Figure 7A:
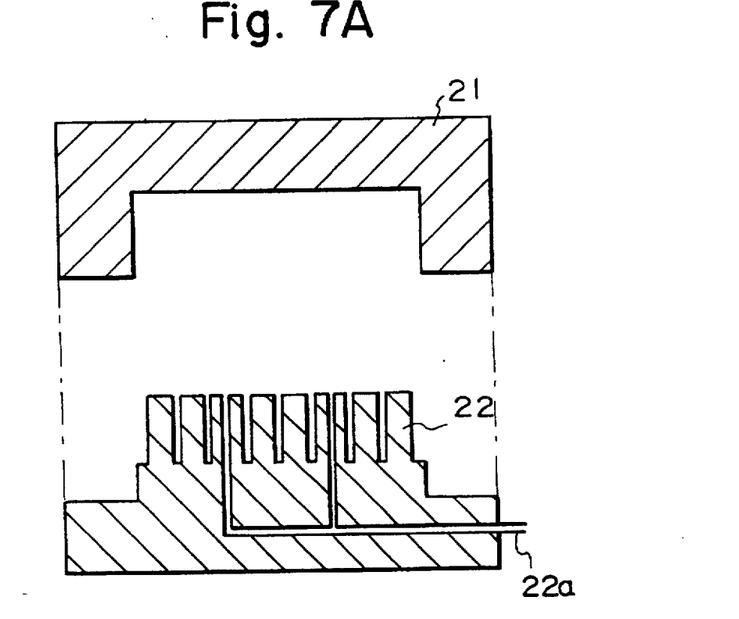
FIGS. 7A to 7C are schematic cross-sectional views respectively showing states in various steps of injection press molding.
Figure 7B:
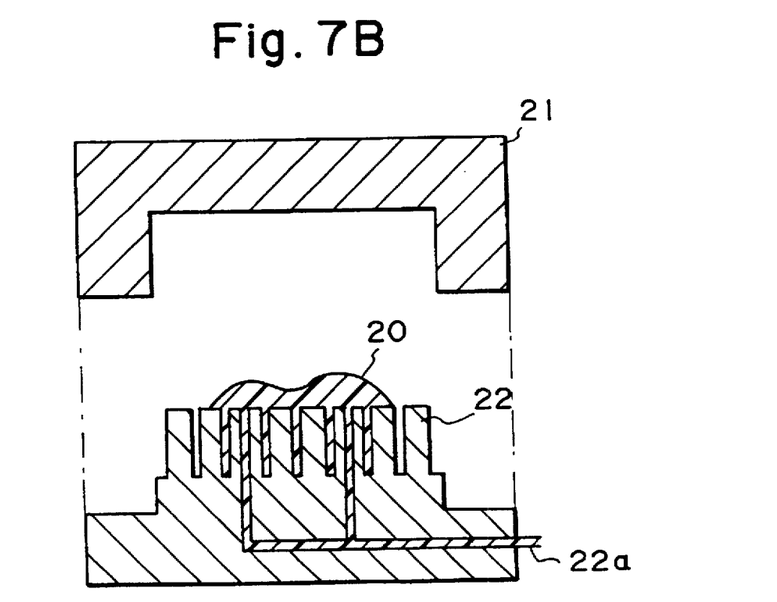

First, into a cavity which becomes a space where a pallet plate 2 as a molded article is formed, in a state where the female mold 21 and the male mold 22 are open as shown in FIG. 7A, a predetermined amount of a material resin (thermoplastic resin) 20 in a molten state is supplied into the cavity as shown in FIG. 7B.

The female mold 21, which is a movable mold, is disposed above the male mold 22. A specular surface portion (cavity face) of the male mold 22, which is a fixed mold, has protruded portions corresponding to forms of side plates 5 as well as ribs 11, and the like of the pallet plate 2 (see FIG. 7D). Also, the male mold 22 is connected, by way of a molten-resin path 22a formed therewithin, to a molten-resin injection apparatus which is not depicted.

Figure 7C:
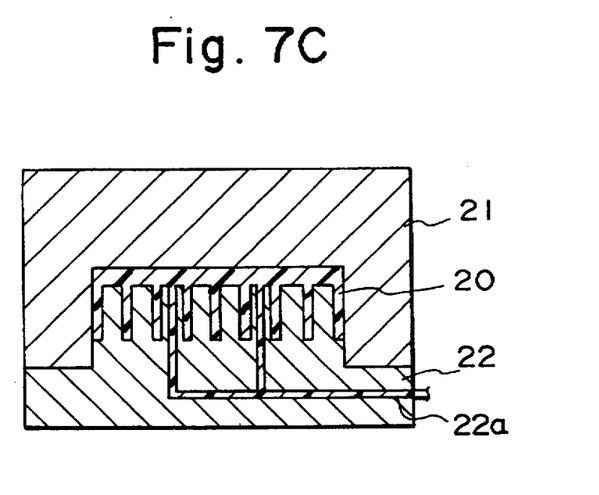
Figure 7D:
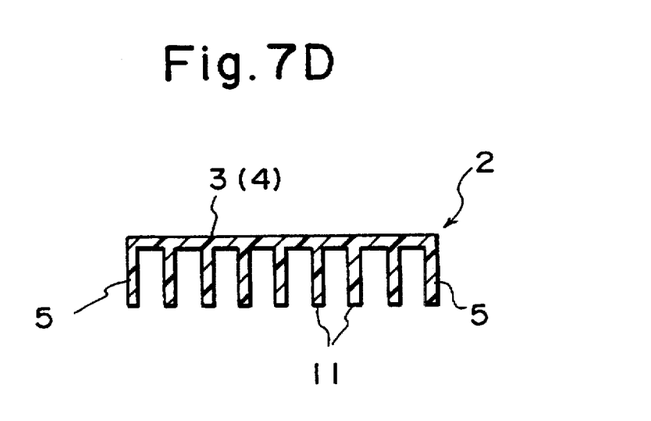
FIG. 7D is a schematic cross-sectional view showing an example of a molded article obtained by the injection press molding.

From this injection apparatus, the material resin 20 is supplied into the cavity by way of the molten-resin path 22a. After the material resin 20 is supplied into the cavity, the molds 21 and 22 are closed together under a predetermined compressive force as shown in FIG. 7C, thereby shaping the molten resin into a predetermined form. Thereafter, the molded article thus shaped is cooled, and the molds 21 and 22 are opened, whereby the pallet plate 2 shown in FIG. 7D is taken out therefrom. Here, the molds 21 and 22 may be closed together while the material resin 20 is being supplied into their cavity.

Examples of the above-mentioned thermoplastic resin include polyethylene resin, polypropylene resin, polyamide resin, polyethylene terephthalate resin, acrylonitrile-butadiene-styrene (ABS) resin, polyvinyl chloride resin, and polycarbonate resin, though not to be restricted thereto. Also, modified products or mixtures of these thermoplastic resins, polymer alloys thereof, or the like may be used. Further, fillers may be compounded in these thermoplastic resins when necessary. Also, additives such as antioxidant, ultraviolet inhibitor, colorant, releasing agent, and low-shrinking agent may be added thereto when necessary.

Also, in the case of press molding (e.g., transfer molding) usable in the present invention, the flowable resin encompasses thermosetting resins as well as molding materials containing fillers such as glass fiber exemplified by BMC and SMC.

In the following, for comparison, a simulation method other than that of the present invention and its results will be explained.

Figure 8:
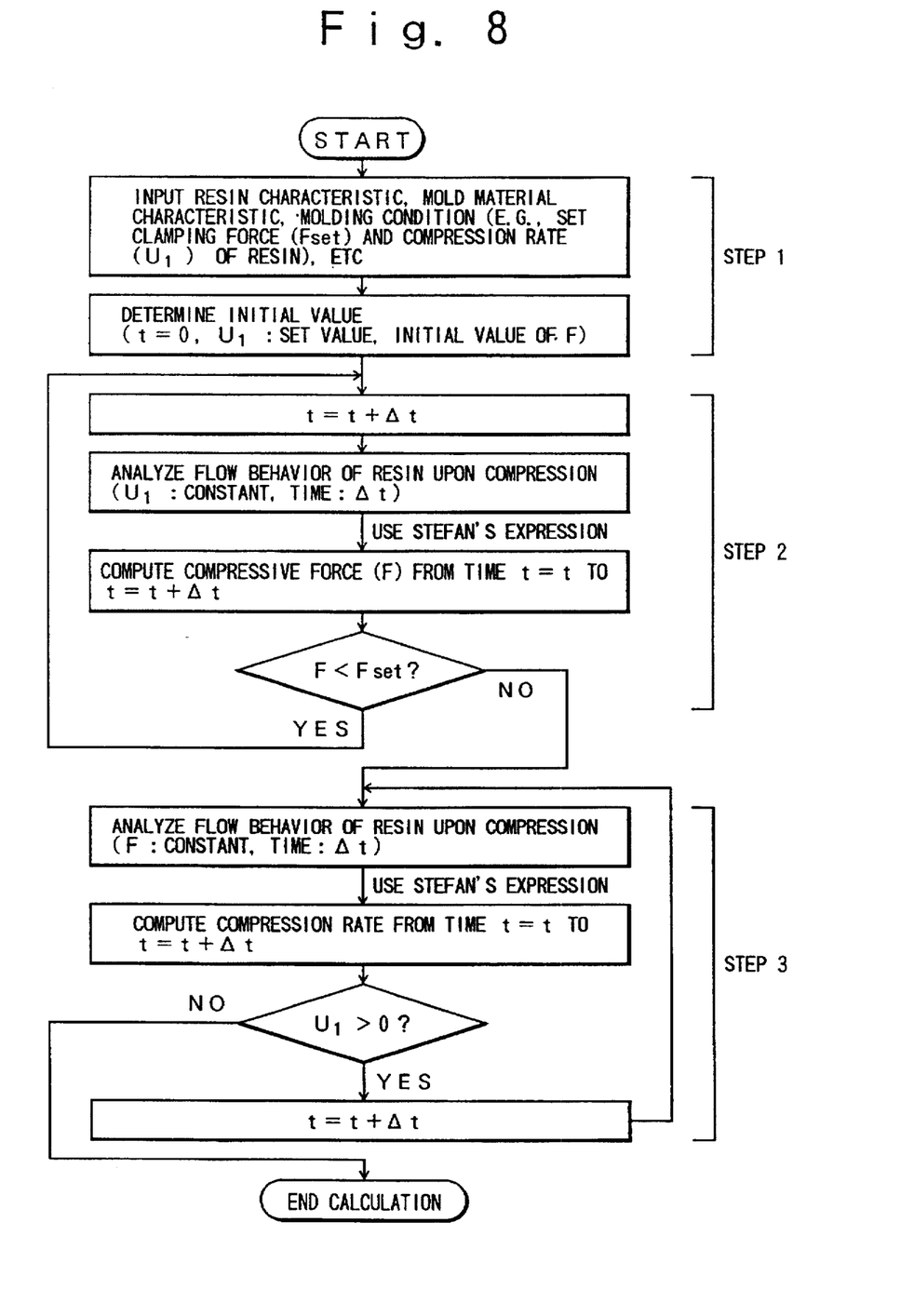
FIG. 8 is a flow chart showing various steps in a comparative simulation method other than the method of the present invention.

FIG. 8 is a flow chart used for injection press-molding simulation which does not include a step of determining the true compression rate according to the present invention. As initial conditions, characteristics of a resin to be molded such as viscosity, specific heat, thermal conductivity, and density; data such as a characteristic (e.g., thermal conductivity) and form of molds; and a molding condition (e.g., resin temperature, mold temperature, amount of resin supplied, and position for starting compression) are input. Also, a theoretical value of compression rate imparted to the resin is input, and an initial value of compressive force (i.e., clamping force at the time of completion of injection) and an upper limit of compressive force F are set. As an initial value for time t, zero is set. (These constitute step 1.) Then, assuming that t=Δt, under the condition where the compression rate is $U_1$ (constant), flow behavior such as extension, temperature, or compressive force of the resin is analyzed with respect to time Δt. As the compressive force F increases as the resin is compressed, it is judged whether this force exceeds the predetermined upper limit or not. Initially at the starting of compression, the judgment yields "NO" since the compressive force is low. In this case, assuming that time t=t+Δt, flow behavior of the resin at the thickness of the resin after time Δt (thickness obtained when the compression distance of the resin is subtracted from the initial thickness) is analyzed again with a constant compression rate. Thus, for each period of time Δt, i.e. based on the presupposition that the resin is compressed by the male and female molds 22 and 21 with a constant rate, flow behavior of the resin at that time is analyzed. (These constitute step 2.)

As explained above, as the compression of resin progresses, the compressive force F reaches the set value of the upper limit. At this time, the hydraulic circuit supplies a constant force F to the female mold.

Accordingly, as a condition for simulation, the compression rate imparted to the resin at each time Δt is determined assuming that the compressive force F is constant, and flow behavior of the resin is analyzed. Then, it is judged whether the compression rate imparted to the resin is zero or not. When the compression rate imparted to the resin is zero, it means that the flowing of the resin is terminated. Since this point of time is the end of the flowing, analysis of flow behavior in the compression process of the resin is ended here. (These constitute step 3).

Figure 9:
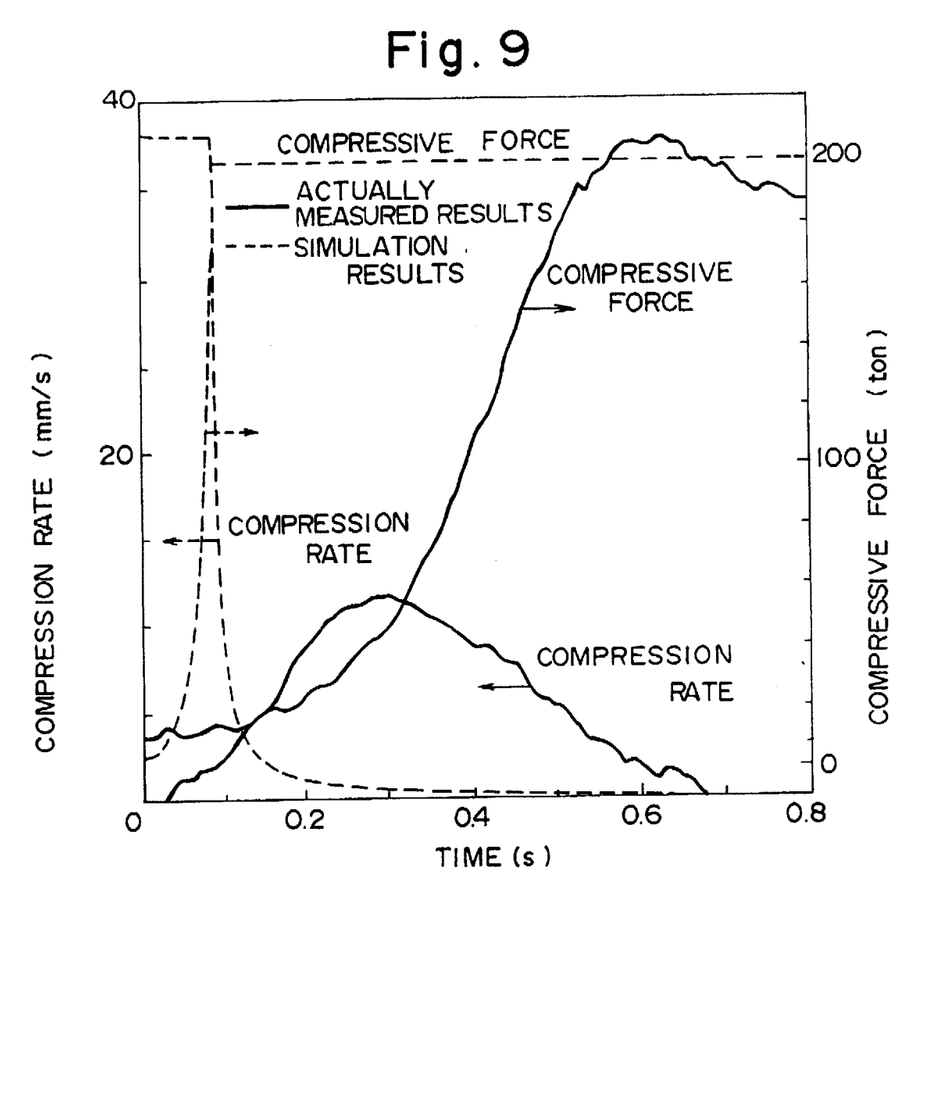
FIG. 9 is a graph showing a relationship between simulation results (compression rate and compressive force) and actually measured data in the comparative simulation method shown in FIG. 8.

FIG. 9 compares the results of calculation by this comparative simulation method with the results of actual measurement. Here, the molds shown in FIG. 3 were subjected to these calculations and measurement while polypropylene (Sumitomo Noblen W501) was used as the resin. As shown in FIG. 9, the compression rate acutely decreases near 0.1 second in this conventional simulation method.

It is due to the fact that, since calculation is made assuming that the compression rate is constant, the compressive force of the resin rapidly reaches the initially set upper limit of compressive force. Accordingly, at 0.1 second or later, the compressive force is in a constant state. By contrast, in the actually measured values, as indicated by continuous curves in the chart, the compressive force gradually increases, while the compression rate moderately ascends and then moderately descends. Thus, the compression rate and compressive force determined according to the above-mentioned comparative simulation method were quite different from their actual values.

As explained in the foregoing, in the method of simulating resin behavior in press molding in accordance with the present invention, since apparatus characteristics of the press molding apparatus are under consideration, while characteristics of the resin are taken into account, changes in the compression rate and compressive force imparted to the resin over time can be simulated with a high accuracy. Also, as analysis of flow behavior of the resin and computation of compression rate or the like are repeated with a high accuracy each time a minute time period has passed, flow behavior of the resin within molds at the time of press molding (injection press molding in particular) can be accurately simulated. For example, accurate simulation of resin pressure and resin temperature distribution at the time of resin association in a multipoint gate mold as well as accurate simulation of required compressive force or the like can be made. Accordingly, when the present invention is utilized, mold configuration, molding condition, molding material, or the like in press molding (injection press molding in particular) can be evaluated with a high accuracy.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A method of simulating flow behavior of a resin in a process for press-molding the resin by use of a press-molding machine comprising a press apparatus equipped with a hydraulic circuit, and first and second molds at least one of which is connected to said press apparatus, said method comprising:

a step of determining, from a characteristic of said hydraulic circuit, an elastic coefficient of said press apparatus, and an apparent elastic coefficient of said resin, a true compression rate imparted to said resin by said press apparatus; and a step of analyzing, based on said true compression rate, flow behavior of said resin.

2. A method according to claim 1, wherein said true compression rate imparted to said resin by said press apparatus is determined from a theoretical compression rate determined from a characteristic of said hydraulic circuit assuming that at least said press apparatus is a rigid body, an elastic coefficient of said press apparatus and an apparent elastic coefficient of said resin, according to the following expression (1):

$$dF = \frac{K_0 K_1}{K_0 + K_1} dX = K_1 dX_1 \quad (1)$$

wherein dF is amount of change in compressive force, $K_0$ is elastic coefficient of the press apparatus, $K_1$ is apparent elastic coefficient of the resin, dX is theoretical amount of change in compression distance and $dX_1$ is true amount of change in compression distance, and the following expression (2):

$$U_1 = \frac{K_0}{K_0 + K_1} U \quad (2)$$

wherein $K_0$ is elastic coefficient of the press apparatus, $K_1$ is apparent elastic coefficient of the resin, U is theoretical compression rate and $U_1$ is true compression rate.

3. A method according to claim 1, wherein said step of determining the true compression rate comprises:

a step (a) of determining an elastic coefficient of said press apparatus;

a step (b) of determining, from the characteristic of said hydraulic circuit, a theoretical compression rate in a first unit period and assuming thus determined theoretical compression rate to be a true compression rate in the first unit period;

a step (c) of determining an amount of change in compressive force and a true amount of change in compression distance in the first unit period assuming that the true compression rate is constant, a step (d) of determining, from the characteristic of said hydraulic circuit, a theoretical compression rate in a second unit period subsequent to said first unit period;

a step (e) of determining, from said amount of change in compressive force and true amount of change in compression distance, an apparent elastic coefficient of said resin and assuming thus determined apparent elastic coefficient of said resin to be an apparent elastic coefficient of the resin in the second unit period;

a step (f) of determining, from said elastic coefficient of the press apparatus, said apparent elastic coefficient of the resin in the second unit period, and said theoretical compression rate in the second unit period, a true compression rate in the second unit period; and wherein said step of analyzing the flow behavior comprises a step (g) of analyzing, based on said true compression rate, flow behavior of the resin in said unit periods.

4. A method according to claim 3, wherein said method comprises a further step (h) of judging whether the true compression rate determined in said step (f) is more than zero or not, wherein when the true compression rate is judged to be more than zero said steps (c) to (f) are repeated so as to successively determine true compression rates in unit periods subsequent to said second unit period.

5. A method according to claim 3, wherein said method comprises a further step (h) of judging whether the true compression rate determined in said step (f) is more than zero or not, wherein, when the true compression rate is judged to be more than zero, said steps (c) to (g) are repeated so as to successively determine true compression rates in unit periods subsequent to said second unit period and, based on thus determined true compression rates, flow behavior of the resin is sequentially analyzed.

6. A method according to claim 3, wherein, in said step (e), the apparent elastic coefficient of the resin in the first unit period is determined from said amount of change in compressive force and true amount of change in compression distance, and then an apparent elastic coefficient of the resin in the second unit period is assumed on the basis of said apparent elastic coefficient of the resin in the first unit period and an apparent elastic coefficient of the resin in a previous unit period.

7. A method according to claim 3, wherein, in said step (e), the apparent elastic coefficient of said resin is determined according to the following expression (1):

$$dF = \frac{K_0 K_1}{K_0 + K_1} dX = K_1 dX_1 \quad (1)$$

wherein dF is amount of change in compressive force, $K_0$ is elastic coefficient of the press apparatus, $K_1$ is apparent elastic coefficient of the resin, dX is theoretical amount of change in compression distance, and $dX_1$ is true amount of change in compression distance.

8. A method according to claim 3, wherein, in said step (f), said true compression rate is determined according to the following expression (2):

$$U_1 = \frac{K_0}{K_0 + K_1} U \quad (2)$$

wherein $K_0$ is elastic coefficient of the press apparatus, $K_1$ is apparent elastic coefficient of the resin, U is theoretical compression rate, and $U_1$ is true compression rate.

9. A method according to claim 3, wherein, in said step (c), said amount of change in compressive force is determined according to the following expression (3):

$$F = \frac{3\pi R^4 \mu(-\dot{h})}{8h^3} \quad (3)$$

wherein F is compressive force, R is radius of the resin, μ is viscosity of the resin, h is ½ of distance between the molds, and −$\dot{h}$ is ½ of compression rate; and said true amount of change in compression rate is determined according to the following expression (4):

$$dX_1 = U_1 \times dt \quad (4)$$

wherein $dX_1$ is true amount of change in compression distance, $U_1$ is true compression rate, and dt is unit period.

* * * * *